Feb. 24, 1931. M. L'HERITIER 1,793,498
MOVING SIDEWALK
Filed Feb. 14, 1929 10 Sheets-Sheet 1
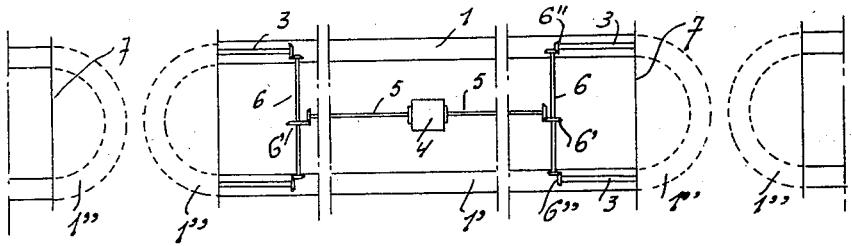
Fig. 1.
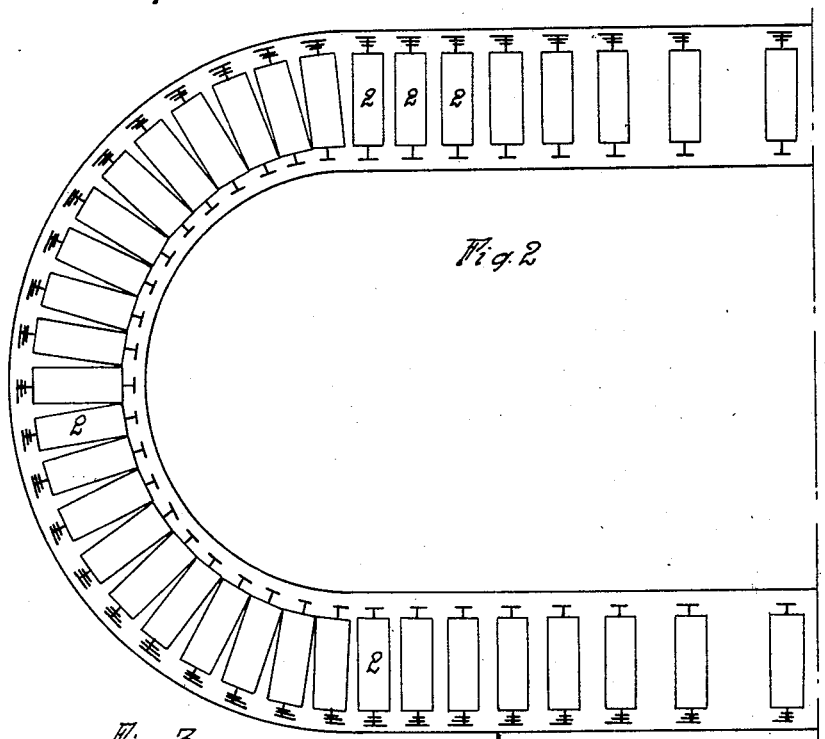
Fig. 2
Fig. 3
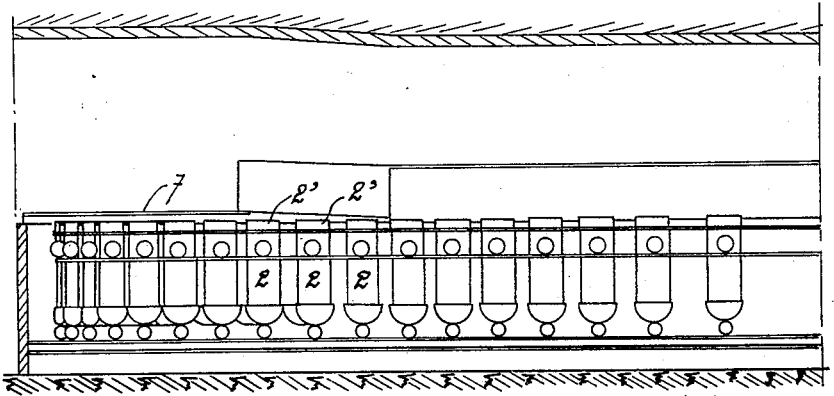
INVENTOR
Maurice L'Heritier
by
Lyman, Parry, Card + Langman
Att'ys.

Feb. 24, 1931. M. L'HERITIER 1,793,498
MOVING SIDEWALK
Filed Feb. 14, 1929 10 Sheets-Sheet 2

Fig. 4

INVENTOR
Maurice L'Heritier
by
Langner, Parry, Card & Langner
Att'ys

Feb. 24, 1931.  M. L'HERITIER  1,793,498
MOVING SIDEWALK
Filed Feb. 14, 1929  10 Sheets-Sheet 7

INVENTOR
Maurice L'Heritier
by
Langner Parry Card & Langner
ATT'YS

Feb. 24, 1931.  M. L'HERITIER  1,793,498
MOVING SIDEWALK
Filed Feb. 14, 1929   10 Sheets-Sheet 9

INVENTOR
Maurice L'Heritier
by
Langner Parry, Card & Langner
Att'ys.

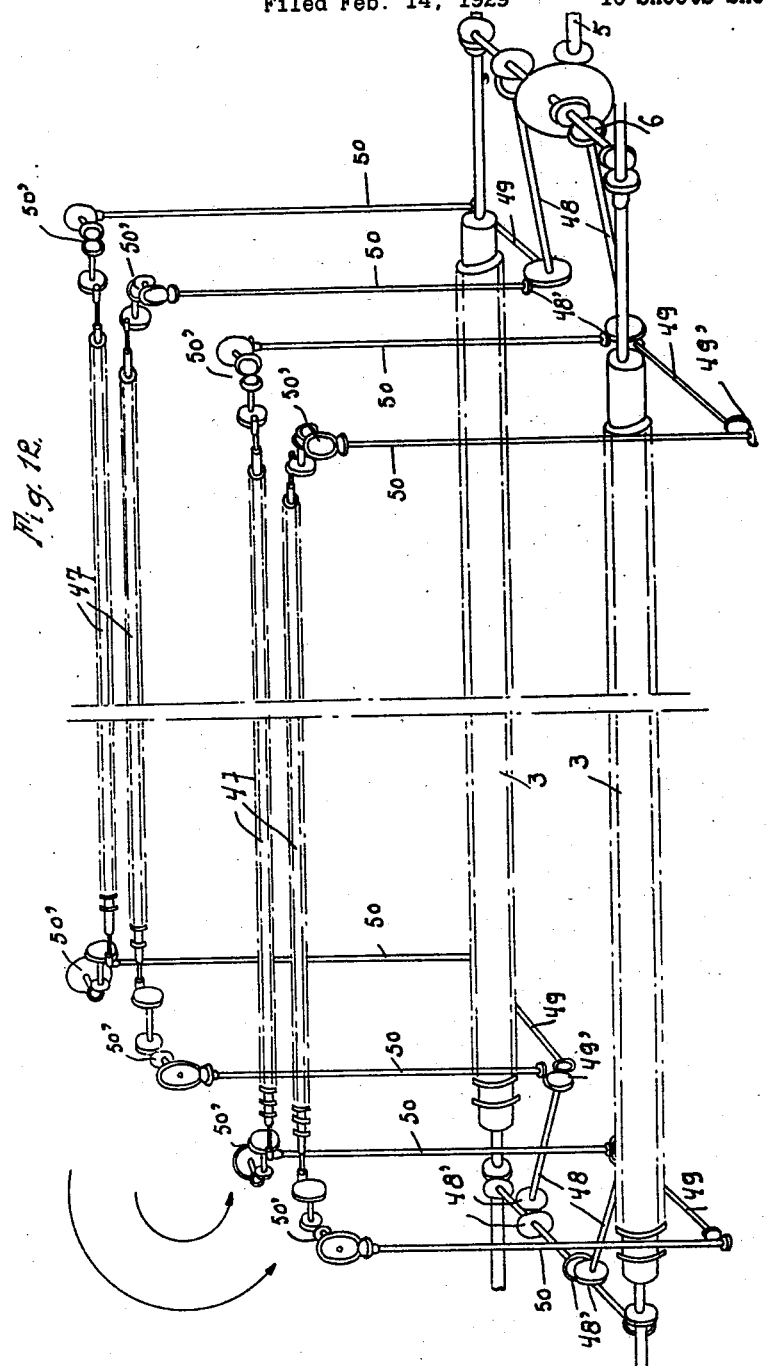

Patented Feb. 24, 1931

1,793,498

UNITED STATES PATENT OFFICE

MAURICE L'HÉRITIER, OF PARIS, FRANCE

MOVING SIDEWALK

Application filed February 14, 1929. Serial No. 339,931.

The present invention relates to a moving sidewalk provided with trucks on which the users take their places and which form a continuous convoy, following a closed circuit which decreases in speed progressively at the stations, to a value permitting the users to be removed without danger onto a fixed surface or to pass from said surface to the trucks. The speed of said trucks subsequently increases up to the normal value.

Following these variations in speed, the trucks are squeezed together at the stations, whereas between the stations they are spread apart a certain distance.

They are connected together by an apron formed by rolling elements pivoted together. Each truck occupies the fraction of apron which is necessary for connecting it to the adjacent truck. Said fraction of apron is folded back inside the corresponding truck when the trucks become gathered together when passing the stations.

On each side of the raceway of the trucks are disposed, at the supporting height, rails or hand-railings becoming displaced with a speed which is constant and the same as that of the trucks. Said hand-railings become extended or shortened according to the spreading or gathering together of the trucks. Obviously they are provided at the stations in a way as to not interfere with the users getting on or getting off.

In the preferred form of the invention, the moving side-walk is divided into sections spread out between two successive stations which they connect in both directions. The course of the trucks consists of two rectilinear parallel parts connected at the stations by semicircular parts above which is provided a fixed flooring for receiving the users of the trucks or from whence the users pass onto the trucks.

The trucks and the moving railings are placed into motion by means of worms placed at the entrance and exit of the stations and turning synchronously. Said worms comprise two parts; one being of regular pitch corresponds to the normal speed of the trucks between the stations, the other being of variable pitch corresponding to the progressive increasing and decreasing speeds of the trucks at the entrance and exit of the stations.

The invention will be more readily understood by those skilled in the art with reference to the accompanying drawing which shows the preferred form of the invention.

In the drawing—

Fig. 1 is a diagram of my improved moving sidewalk, showing one entire section thereof, and a portion of the adjacent sections;

Fig. 2 shows one of the turning portions to a larger scale;

Fig. 3 is an elevational view corresponding to Fig. 2;

Fig. 4 is a front view of a truck on a larger scale;

Figure 8:
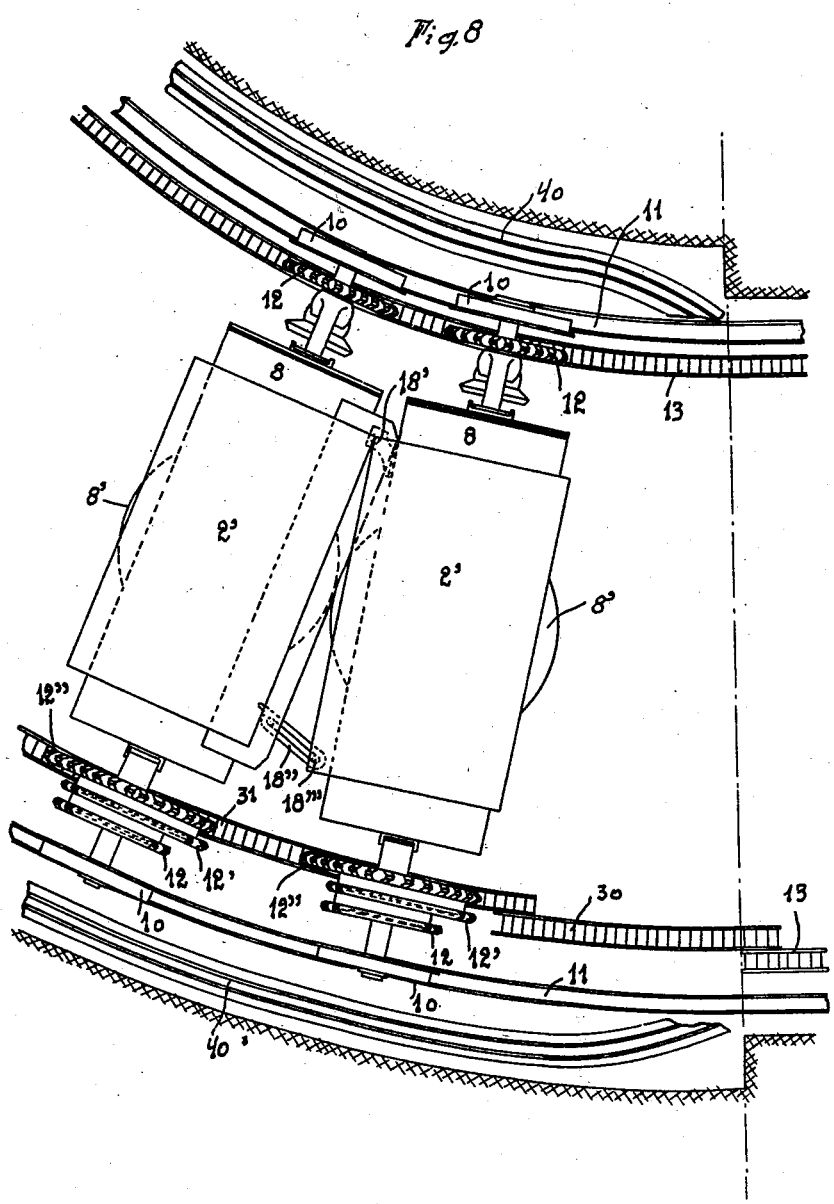
Fig. 8 is a plan view of two adjacent trucks on a turn on the same scale as Fig. 6.
Figure 9:
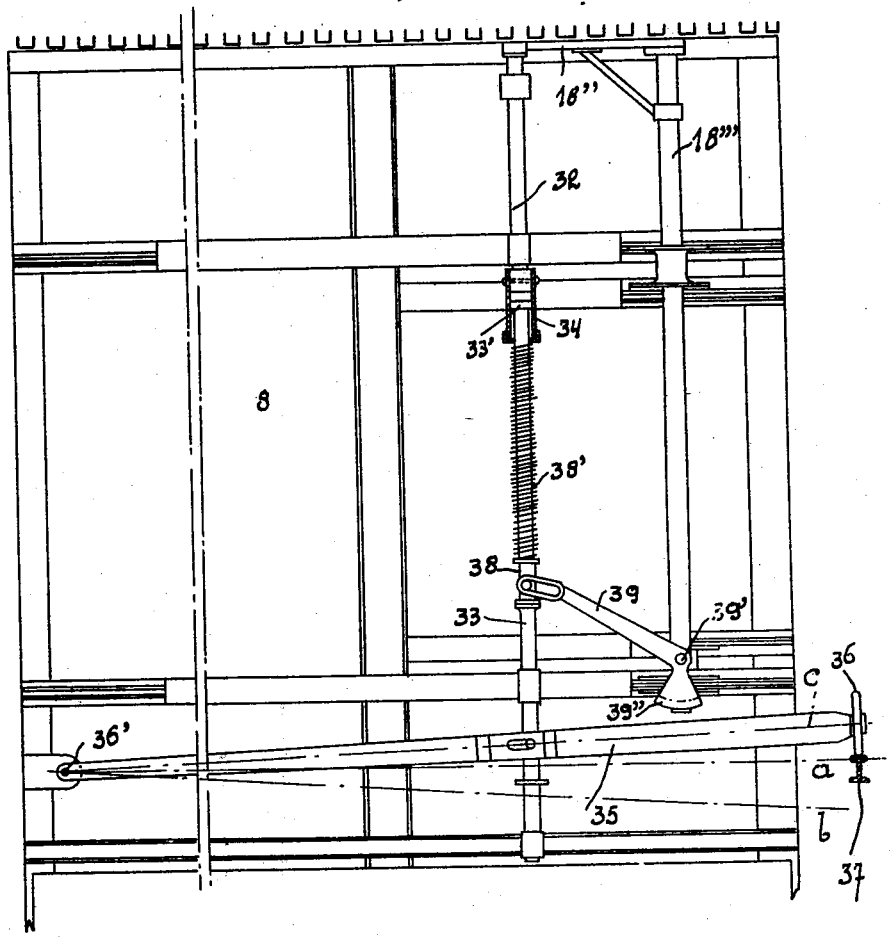
Figure 10:
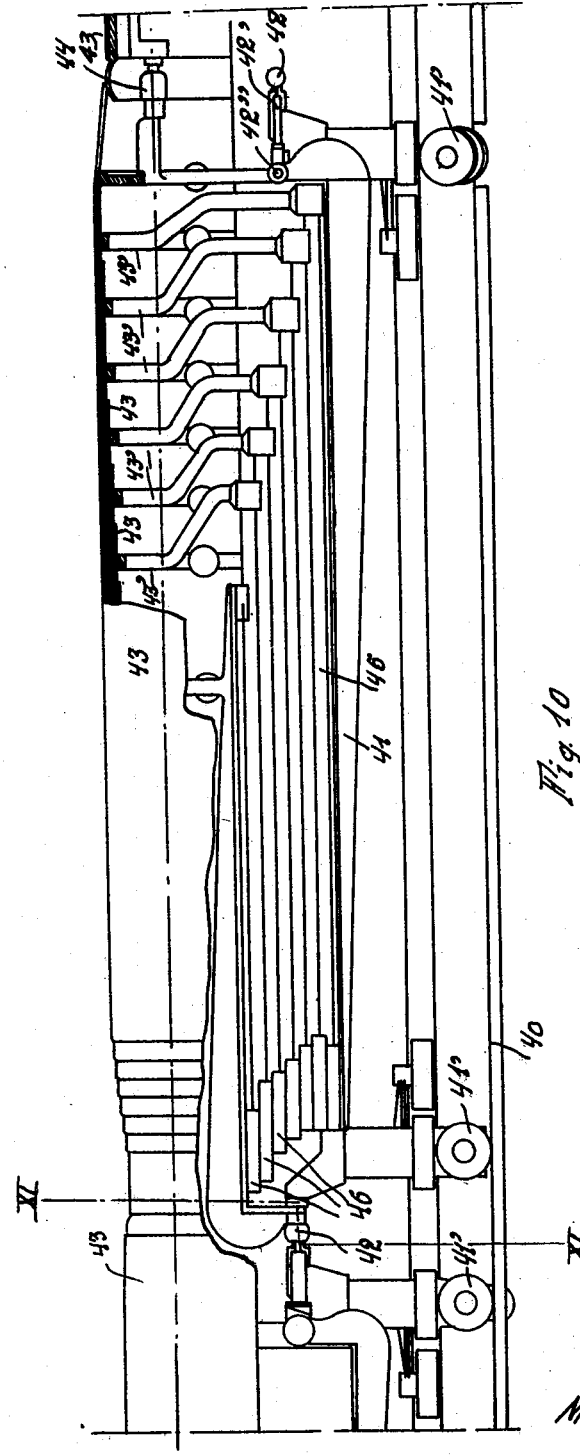
Figure 11:
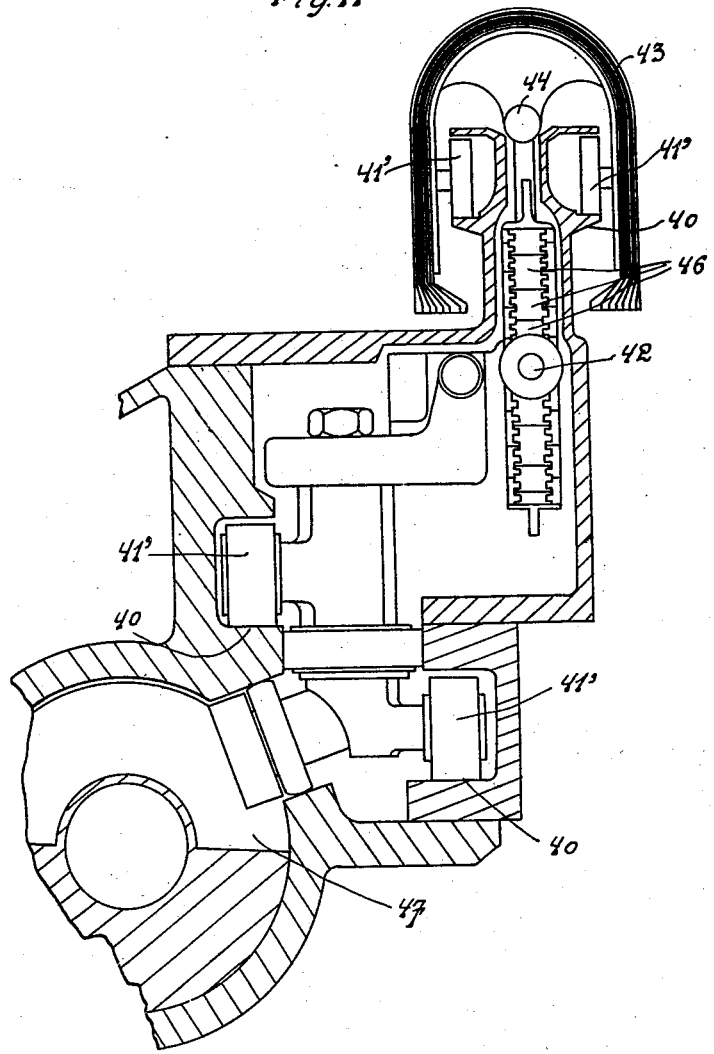

Figure 8' shows in elevation the different racks for entering and leaving the curves and turns, and should be assumed as being a development on a vertical plane;

Fig. 9 illustrates a truck seen from another face than in Fig. 4, but to the same scale;

Fig. 10 is a transverse section through a portion of a railing on a large scale;

Fig. 11 is a section taken along the line 11—11 of Fig. 10; and

Fig. 12 is a diagrammatic view of a worm control system of a station.

Referring to the drawing more in detail, in which like reference characters represent similar parts throughout the several views, the moving sidewalk, according to my invention is constituted of sections which spread out between the two stations that they connect in both directions and underground. Each section is constituted by two rectilinear runways 1—1' connected at their extremities by two semicircular parts of equal radius as shown at 1''. On the circuit thus established roll the trucks 2 forming a continuous row with varying distance between trucks. Said trucks are placed in movement through the medium of worms 3 which are extended along a certain portion of the length before and after the curved parts of the line. A motor 4, which is placed between the two stations, drives all the worms 3 by means of a longitudinal shaft 5 and transverse shafts 6 through the medium of gears 6′ 6″.

Near their extremity farthest from the beginning of the curves of the runway, the worms have a portion of constant pitch succeeded by a variable pitched portion. It follows that the trucks, separated between the stations by a constant interval, progressively move together when arriving at the stations, passing the curves in contact with each other, and gradually retaking their spaced apart normal position after having left the station.

At the stations, the trucks 2 pass beneath a fixed flooring 7 which gradually slopes down to a level near that of the upper surfaces of the trucks 2′. The users can therefore without difficulty pass from the fixed flooring 7 to said surface and vice versa. The same floor 7 is common to two sections of sidewalk in order to pass from one of said sections to the following one. Admittance of the users at the stations may be regulated if necessary by means of turnstiles turning at a constant speed.

Each truck 2 comprises a hollow body or sheath 8, of a relatively high extent, (Fig. 4) provided with two axles placed in the same vertical plane, one near the upper part of the sheath, and the other near the base thereof. Said axles are connected between each other by means of a vertical shaft 9, through the medium of pairs of bevelled gears 9′, 9″. The said axles carry wheels 10 running on rails 11, and toothed wheels 12, in engagement with racks 13 extending along said rails. The wheels 10 are loosely mounted on the axles, while the wheels 12 are keyed thereto.

At the side of wheels 10 which are situated on the outside of the turns, there are in addition two other rack wheels 12′, 12″ rigid with the axles. The wheel 12′ is larger than the wheel 12 but smaller than the wheel 12″. The wheel 12″ is made eccentric in such manner that the extremities of its most eccentric diameter terminate respectively at the same distance from the axle as do the respective peripheries of the wheels 12 and 12′. The purpose of the wheels 12′ and 12″ will be more obvious further on.

The lower axle carries in addition on each side rollers 14 which roll on special rails 14′.

The sheath 8 carries therebeneath a buffer plate 8′ and, on a vertical pivot 15, a pair of rollers 15′, 15″. One roller 15″ is destined to come into engagement with the driving worms 3. The other of said rollers 15′ rolls along an edge of a longitudinal slot provided in the casing 16 of the said worms.

Figure 6:
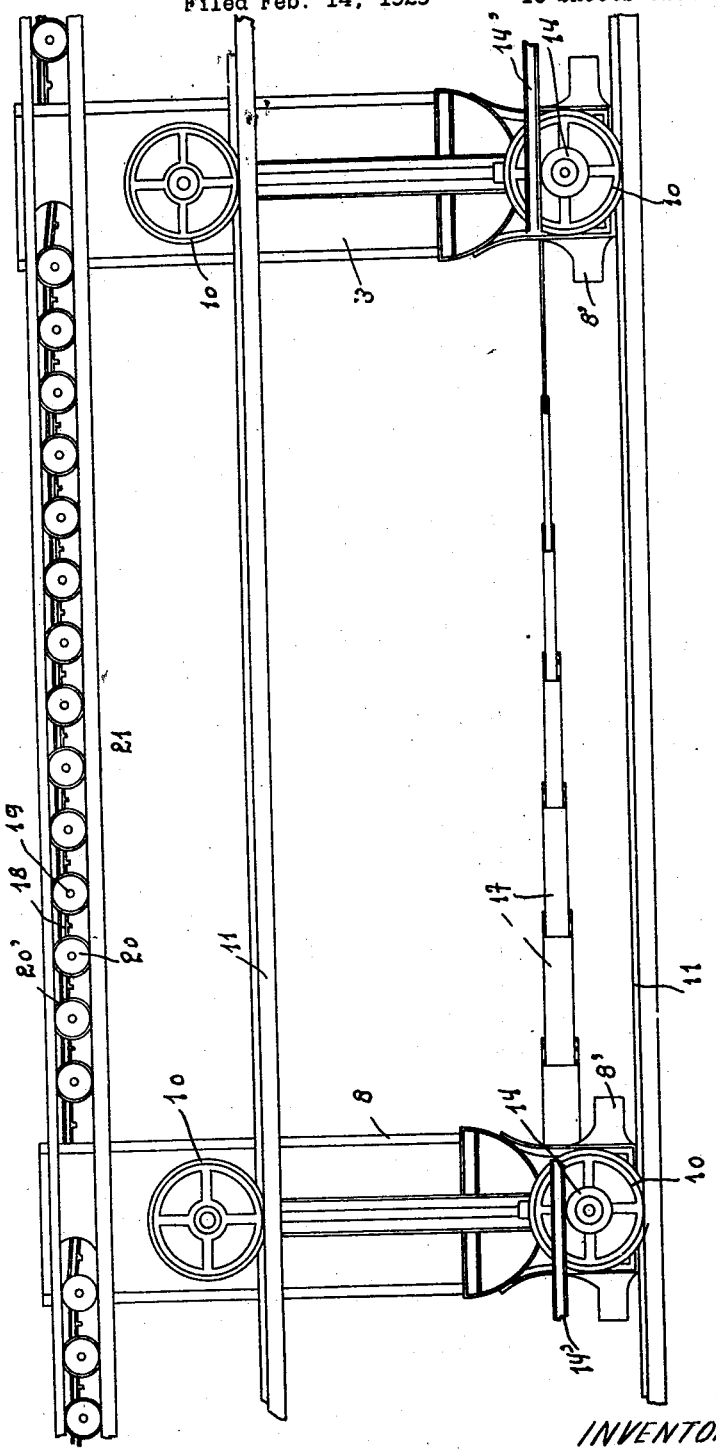
Fig. 6 shows two adjacent trucks at their position of maximum separation on a smaller scale.

The trucks 2 are connected to each other near their base by means of telescopic couplings 17 permitting a variation in distance therebetween (Fig. 6). The said trucks are furthermore connected together at their top by an apron formed of elements 18, articulated between each other on shafts 19 which carry rollers 20 rolling on rails 21, and other rollers 20′ of larger diameter. The upper part of the elements 18 is at the same height as the upper surface of the trucks. The head element is pivoted at one side to the preceding truck at 18′ and on the other side is connected to the same sheath through the medium of a link 18″ carried at the extremity of an arbor 18‴ journalled vertically (Figs. 8 and 9).

Figure 5:
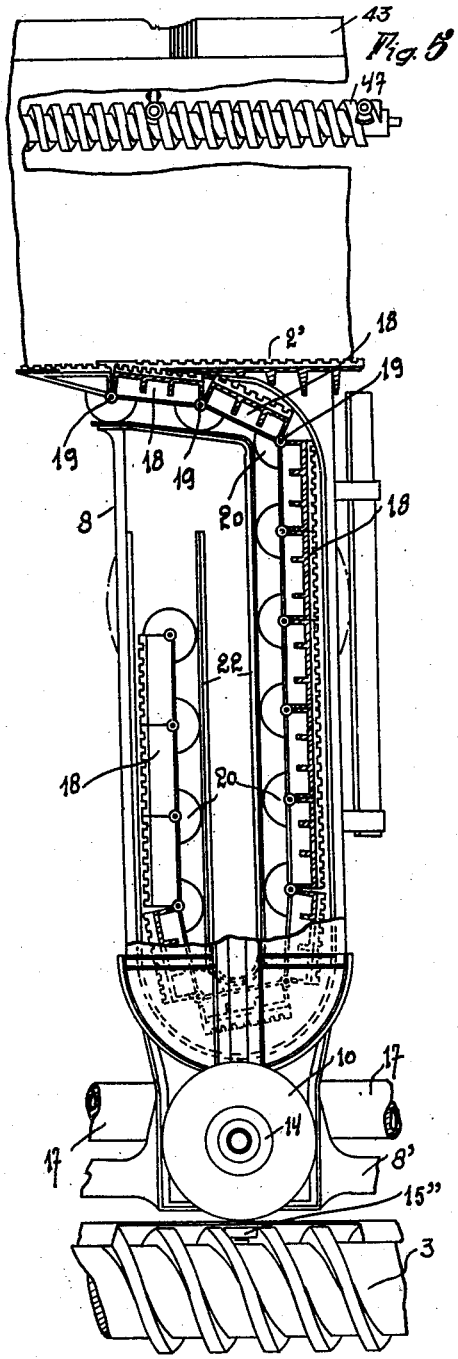
Fig. 5 is a corresponding side view with parts broken away.

The chain formed by the elements 18 is lodged at the stations within sheaths 8 where guides 22 are provided on which roll the wheels 20′ and which cause the moving apron to become folded as indicated in Fig. 5 when it has entirely entered the said sheath.

Figure 7:
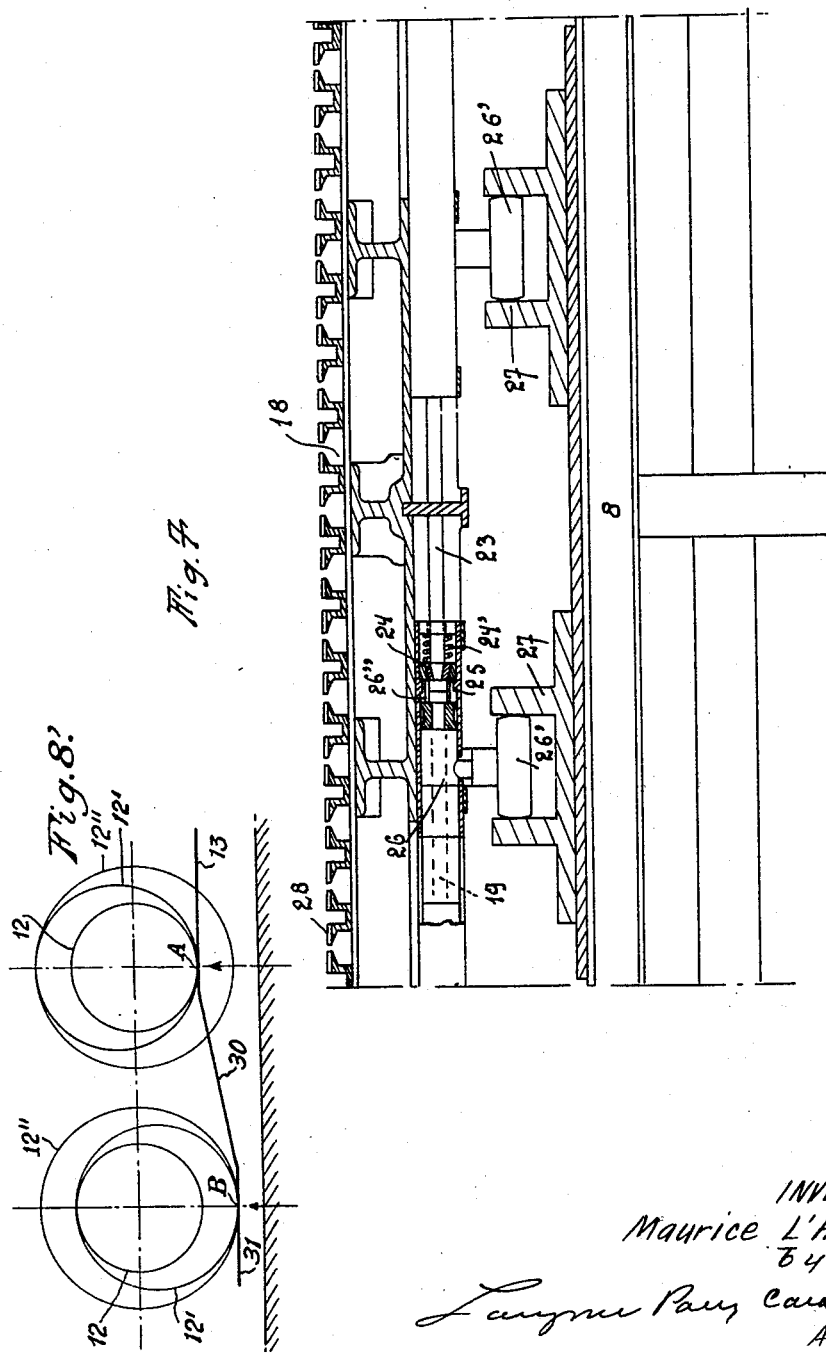
Fig. 7 is an enlarged detail of Fig. 4.

The axle 19 of the wheels 20 and 20′ is susceptible to shrinking in a way to allow the said roller to enter the sheath when the apron is folded, whereas it becomes lengthened in the opposite case in order that the rollers 12 may come in contact with the rails for that purpose (Fig. 7).

Said axle is to this end divided into two parts between which is interposed a rod 23, carrying at each extremity a slotted cone 24 to which is adapted a housing of inverse form in a casing 25 surrounding the axle 19. Said cone is provided with an opposing spring 24′. The casing 25 serves likewise as a guide for one of the members 26 which can slide therein. The members 26 carry on their vertical shafts traversing the wall of the casing 25 through suitable slots, rollers 26′, destined to come into engagement with rails 27, placed near the entrance to the sheath. Said rails have, at their extremity, a distance between sides which corresponds to the normal width of the axle 19, and at their beginning, a smaller distance which corresponds to the maximum shortening of the said axle.

When the apron is unfolded, the rollers 26′ are out of reach of the rails, in such wise that the intermediate rod 23 wedges the cones in their housing. When the apron becomes folded up, the rollers 26′ are brought together by the rails 27 and the members 26 unwedge by means of push pieces 26″ carried thereby, the cones 24 which allow passage of the rod 23 in a way to allow shortening of the axle 19. At the same time, the wheels 20′ move onto a rail 29 and raise the wheels 20 above the rails 21 (Fig. 4).

The upper part of the elements 18 of the apron and the upper surface of the trucks are provided with ribs 28 parallel to the raceways and between which are engaged the bars of a grid which moves upon the fixed flooring 7 of the stations. This arrangement facilitates the access of the travellers on the trucks and their passage from the said trucks onto the fixed flooring 7.

When the trucks pass beneath floors they become squeezed together to a maximum and come into mutual contact at their buffer plates 8'. During the turns which follow, it is necessary that the outer wheels of the trucks turn faster than the wheels disposed on the inside of the turns (Fig. 8). This condition is obtained by means of the wheels 12' and 12" above mentioned.

The wheels 12' approach, by that portion thereof nearest the axle, a rack 31 which lowers from the level of the rack 13 along a curved path to the level of the rack 31 with which latter the wheels 12' engage during a veering or divergence from a straight line, and which rack is located at a lower level than the rack 13, so that the axles can remain horizontal a construction clearly shown in Figure 8'.

In order that the change of racks may be effected correspondingly, it is sufficient:—

1. That the length of the rack 13 be an exact multiple of the horizontal circumference of the wheel 12, in order, that the eccentric wheel 12' may always approach the beginning of the transition rack 30 by its part A nearest the axle.

2. That the length of the transition rack 30 be equal to half the original circumference of the wheel 12, in order that the said wheel may make half a revolution during the transition from one rack to another.

3. That the length of rack 31 be an exact multiple of the original circumference of rack 12', in order that the eccentric wheel 12' will approach the rack 30, when leaving the curve, by means of its part B farthest from the axle.

The difference between the radii of wheels 12' and 12" is selected so that, during veering or turning, all the axles converge towards the center of turning, a condition essential to proper operation.

During the turning, the trucks make a certain angle between each other which is sustained by the link 18". During normal running, the trucks being parallel, the said link becomes folded back against the sheath which carries it. It becomes locked in this position by the device illustrated in Fig. 9.

This device comprises a vertical rod 32, forming a latch susceptible when raised of coming into engagement with the extremity of the link 18" now folded back. The latch rod 32 is connected with another rod 33 which is disposed in alignment therewith by means of a cylinder 34 in which plays a piston 33' rigid with the rod 33. Near the base of rod 33 is pivoted a lever 35 transversally disposed with respect to the truck. Said lever, whose pivot point is at 36' on the sheath, carries at its extremity a roller 36, destined to meet a cam rail 37 at the beginning of the turn.

The rod 33 carries a sleeve 38 on which bears a spring 38' abutting the cylinder 34 at the other extremity. The sleeve 38 is subjected to the action of an arm 39, pivoted to the sheath of the truck at 39' and rigid with a toothed sector 39" adapted to engage a pinion (not shown) carried by the pivoting arber 18''' of the link 18".

At the beginning of the turn, the section of the cam rail decreases in a way that the lever 35 swings from its normal position $a$ to the position $b$, which has for effect to cause the latch rod 32 to descend, which disengages the link 18". The arm 39 pivots toward the bottom due to the force exerted by the apron on the link 18". At the end of a turn, the section of the cam rail 37 becomes raised, in a way that the lever 35 pivots toward the top until it reaches the position $c$. During this time the link 18" in moving back has caused the latch rod to operate through the medium of arm 39, with a certain delay, and locking takes place. The spring 38' is compressed to the bottom and piston 33' is at the end of its stroke.

After locking, the link 18" cannot move backwards and the arm 39 in the position indicated. The section of the cam rail decreases sufficiently subsequently for permitting the rod 33 to become lowered slowly to the extent allowed by the stroke of piston 33'. The lever 35 retakes its normal position $a$.

The straight runways which are travelled by the trucks are bordered, up to the supporting height, with concave walls, in order to prevent any contact of the passengers with said walls. At the top of said walls are provided raceways 40 for extensible banisters which become displaced always at the same speed as the trucks corresponding thereto (Figs. 10, 11 and 5) and become unfolded in accordance with the spacing of said trucks.

As illustrated, the banisters are formed in sections carried by the trucks 41 with supporting rollers 41'. Said trucks are yoked together by means of ball and socket joints 42 mounted at the extremity of rods 42', adapted to be displaced vertically by swinging about 42".

A section of banisters comprises eight elements 43 telescoping into each other. The extreme outer element of a section of banisters is connected to the extreme inner element of the adjacent section by a ball and socket 44 disposed in the same vertical plane as the ball and socket 42. Each of the elements 43 is made rigid by means of an arm 43' with a rod 45 which carries at its extremity a block 46. Said block is susceptible to sliding when the banister is unfolded or folded up beneath the rod 45 of the extreme outer element. When an element is completely unfolded, its block 46 meets the base of the arm 45 of the extreme inner element which becomes unfolded in turn.

In order that the elements of the banisters do not slide before their turn, the blocks 46 are united temporarily between each other by means of bolts which are released one after another by meeting an arm carried by the base of the arms 43'. Reengagement is produced in inverse order by the same means, when the banister becomes shortened.

At the stations, the trackways of the banisters pass beneath the floor 7, as indicated in Fig. 8.

The displacement of the banisters, their lengthening and shortening, are controlled by worms 47 parallel to the driving screws of the trucks and situated similar thereto near the entrance and exit to the stations.

The screws 47 have a pitch which varies to the same extent as that of screws 3. Fig. 12 shows how all the worms of a station are synchronously controlled from the driving shaft 5. The movement is transmitted to the worms 47 through the medium of the longitudinal shafts 48, transverse arbors 49 and vertical arbors 50 carrying the necessary wheels 48', 49', 50'.

While I have disclosed what I deem to be the preferred form of my device I do not wish to be limited thereto as there might be many changes made in the form, construction and arrangement of the various parts of my apparatus, without departing from the spirit of the invention as comprehended within the scope of the appended claims.

Having described my invention what I claim as new and desire to secure by Letters Patent is:

1. A moving sidewalk of the type described comprising in combination, a plurality of groups of closed circuits of trucks normally spaced at regular intervals, a station disposed between each pair of adjacent closed circuits for facilitating travel in both directions, means for displacing said trucks at a predetermined speed, means for progressively diminishing the speed of said trucks when approaching a station, means for progressively increasing the speed of said trucks up to normal value when leaving a station and means for decreasing the distance between trucks when passing a station whereby mounting and descending from the sidewalk is facilitated.

2. A moving sidewalk of the type described comprising in combination a plurality of groups of closed circuit trackways, each consisting of two straight parallel sections interconnected at the extremities by semi-circular sections of equal radius, a plurality of trucks normally spaced at regular intervals mounted on each of said trackways, a station disposed between each pair of adjacent trackways for facilitating travel in both directions, means for displacing said trucks at a predetermined speed, means for progressively diminishing the speed of said trucks when approaching a station, means for progressively increasing the speed of said trucks up to normal value when leaving a station and means for decreasing the distance between trucks when passing a station whereby mounting and descending from the sidewalk is facilitated.

3. A moving sidewalk of the type described comprising in combination a plurality of displaceable trucks normally spaced at regular intervals, a plurality of stations disposed along the course followed by said trucks, means for displacing said trucks at a predetermined speed, means for progressively diminishing the speed of said trucks when approaching a station, means for progressively increasing the speed of said trucks up to normal value when leaving a station, means for decreasing the distance between trucks when passing a station whereby mounting and descending from the sidewalk is facilitated, a displaceable apron pivotally connected to said trucks, and means for concealing said apron in said trucks, when said trucks are moved together during passage through a station.

4. A moving sidewalk of the type described comprising in combination, a plurality of groups of closed circuits of trucks normally spaced at regular intervals, a station disposed between each pair of adjacent closed circuits for facilitating travel in both directions, means for displacing said trucks at a predetermined speed, means for progressively diminishing the speed of said trucks when approaching a station, means for progressively increasing the speed of said trucks up to normal value when leaving a station, means for decreasing the distance between trucks when passing a station whereby mounting and descending from the sidewalk is facilitated, a displaceable apron pivotally connected to said trucks, and means for concealing said apron in said trucks, when said trucks are moved together during passage through a station.

5. A moving sidewalk of the type described comprising in combination a plurality of displaceable trucks normally spaced at regular intervals, a plurality of stations disposed along the course followed by said trucks, a worm of constant pitch for displacing said trucks at a predetermined speed, a worm having a progressively diminishing pitch disposed at the entrance to each station for gradually diminishing the speed of said trucks when approaching a station, a worm having a progressively increasing pitch disposed at the exit of each station for gradually increasing the speed of said trucks up to normal value when leaving a station, and means for producing synchronous rotation of said worms.

6. A moving sidewalk of the type described comprising in combination, a plurality of groups of closed circuits of trucks normally spaced at regular intervals, a station disposed between each pair of adjacent closed circuits for facilitating travel in both directions, a worm of constant pitch for displacing said trucks at a predetermined speed, a worm having a progressively diminishing pitch disposed at the entrance to each station for gradually diminishing the speed of said trucks when approaching a station, a worm having a progressively increasing pitch disposed at the exit of each station for gradually increasing the speed of said trucks up to normal value when leaving a station, and means for producing synchronous rotation of said worms.

7. A moving sidewalk of the type described comprising in combination a trackway consisting of two straight parallel sections interconnected at the extremities by semicircular sections of equal radius, a plurality of displaceable trucks normally spaced at regular intervals mounted on said trackway, a plurality of stations disposed along said trackway, means for displacing said trucks at a predetermined speed, means for progressively diminishing the speed of said trucks when approaching a station, means for progressively increasing the speed of said trucks up to normal value when leaving a station, a plurality of toothed wheels of varying diameters carried by each of said trucks, and a rack for each of said wheels for bunching said trucks together when traversing said semicircular sections whereby mounting and descending from said sidewalk is facilitated.

8. A moving sidewalk of the type described comprising in combination a plurality of groups of closed circuit trackways, each consisting of two straight parallel sections interconnected at the extremities by semi-circular sections of equal radius, a plurality of trucks normally spaced at regular intervals mounted on each of said trackways, a station disposed between each pair of adjacent trackways for facilitating travel in both directions, means for displacing said trucks at a predetermined speed, means for progressively diminishing the speed of said trucks when approaching a station, means for progressively increasing the speed of said trucks up to normal value when leaving a station, a plurality of toothed wheels of varying diameters carried by each of said trucks, and a rack for each of said wheels for bunching said trucks together when traversing said semicircular sections whereby mounting and descending from said sidewalk is facilitated.

9. A moving sidewalk of the type described comprising in combination a plurality of displaceable trucks normally spaced at regular intervals, a plurality of stations disposed along the course followed by said trucks, means for displacing said trucks at a predetermined speed, means for progressively diminishing the speed of said trucks when approaching a station, means for progressively increasing the speed of said trucks up to normal value when leaving a station, means for decreasing the distance between trucks when passing a station whereby mounting and descending from the sidewalk is facilitated, a plurality of telescoping hand-railings disposed along the course followed by said trucks, means for displacing said hand-railings with said trucks, and means for causing the length of said hand railings to vary in accordance with the spacing of said trucks.

10. A moving sidewalk of the type described comprising in combination, a plurality of groups of closed circuits of trucks normally spaced at regular intervals, a station disposed between each pair of adjacent closed circuits for facilitating travel in both directions, means for displacing said trucks at a predetermined speed, means for progressively diminishing the speed of said trucks when approaching a station, means for progressively increasing the speed of said trucks up to normal value when leaving a station, means for decreasing the distance between trucks when passing a station whereby mounting and descending from the sidewalk is facilitated, a plurality of telescoping hand-railings disposed along the course followed by said trucks, means for displacing said hand-railings with said trucks, and means for causing the length of said hand railings to vary in accordance with the spacing of said trucks.

11. A moving sidewalk of the type described comprising in combination, a plurality of displaceable trucks normally spaced at regular intervals, a plurality of stations disposed along the course followed by said trucks, means for displacing said trucks at a predetermined speed, means for progressively diminishing the speed of said trucks when approaching a station, means for progressively increasing the speed of said trucks up to normal value when leaving a station, means for decreasing the distance between trucks when passing a station, whereby mounting and descending from the sidewalk is facilitated, a plurality of telescoping hand-railings disposed along the course followed by said trucks, a worm drive for displacing said hand-railings, and means for synchronizing said worm drive with said truck driving and controlling means whereby said hand-railings are varied in length in accordance with the spacing of said trucks.

12. A moving sidewalk of the type described comprising in combination a plurality of displaceable trucks normally spaced at regular intervals, a plurality of stations disposed along the course followed by said trucks, means for displacing said trucks at a predetermined speed, means for progressively diminishing the speed of said trucks when approaching a station, means for progressively increasing the speed of said trucks up to normal value when leaving a station, means for decreasing the distance between trucks when passing a station whereby mounting and descending from the sidewalk is facilitated, a plurality of telescoping hand-railings disposed along the course followed by said trucks, means for causing the length of said hand-railings to vary in accordance with the spacing of said trucks, and latching means coacting mutually with said handrailings for preventing opening and closing out of proper sequence with respect to said trucks.

13. A moving sidewalk of the type described comprising in combination a plurality of displaceable trucks normally spaced at regular intervals, a plurality of overlapping landing platforms disposed along the course followed by said trucks, means for displacing said trucks at a predetermined speed, means for progressively diminishing the speed of said trucks when approaching a landing platform, means for progressively increasing the speed of said trucks up to normal value when leaving a landing platform and means for decreasing the distance between trucks when passing beneath a landing platform whereby mounting and descending from the sidewalk is facilitated.

14. A moving sidewalk of the type described comprising in combination, a plurality of groups of closed circuits of trucks normally spaced at regular intervals, a landing platform adapted to overlap each pair of adjacent closed circuits for facilitating travel in both directions, means for displacing said trucks at a predetermined speed, means for progressively diminishing the speed of said trucks when approaching a landing platform, means for progressively increasing the speed of said trucks up to normal value when leaving a landing platform and means for decreasing the distance between trucks when passing beneath a landing platform whereby mounting and descending from the sidewalk is facilitated.

15. A moving sidewalk of the type described comprising in combination a plurality of groups of closed circuit trackways, each consisting of two straight parallel sections interconnected at the extremities by semi-circular sections of equal radius, a plurality of trucks normally spaced at regular intervals mounted on each of said trackways, a station disposed between each pair of adjacent trackways for facilitating travel in both directions, means for displacing said trucks at a predetermined speed, means for progressively diminishing the speed of said trucks when approaching a station, means for progressively increasing the speed of said trucks up to normal value when leaving a station, a plurality of toothed wheels disposed on the inner and outer sides of said trucks, a rack for each of said wheels for bunching said trucks together when traversing said semicircular sections, a pair of toothed wheels of different diameters cooperating with each of said outer toothed wheels aforementioned, and a rack for each of said last mentioned wheels, the racks for said outer wheels being adapted to successively mesh with said outer wheels whereby mounting and descending from said sidewalk is facilitated and proper positioning of said trucks when passing said semicircular sections is assured.

16. A moving sidewalk of the type described comprising in combination a trackway consisting of two straight parallel sections interconnected at the extremities by semicircular sections of equal radius, a plurality of displaceable trucks normally spaced at regular intervals mounted on said trackway, a plurality of stations disposed along said trackway, means for displacing said trucks at a predetermined speed, means for progressively diminishing the speed of said trucks when approaching a station, means for progressively increasing the speed of said trucks up to normal value when leaving a station, a plurality of toothed wheels disposed on the inner and outer sides of said trucks, a rack for each of said wheels for bunching said trucks together when traversing said semicircular sections, a pair of toothed wheels of different diameters cooperating with each of said outer toothed wheels aforementioned, and a rack for each of said last mentioned wheels, the racks for said outer wheels being adapted to successively mesh with said outer wheels whereby mounting and descending from said sidewalk is facilitated and proper positioning of said trucks when passing said semicircular sections is assured.

17. A moving sidewalk of the type described comprising in combination a trackway consisting of two straight parallel sections interconnected at the extremities by semicircular sections of equal radius, a plurality of displaceable trucks normally spaced at regular intervals mounted on said trackway, a plurality of stations disposed along said trackway, means for displacing said trucks at a predetermined speed, means for progressively diminishing the speed of said trucks when approaching a station, means for progressively increasing the speed of said trucks up to normal value when leaving a station, a plurality of wheels disposed on the inner side of said trucks, a toothed rack adapted to mesh with each of said wheels, a plurality of groups of toothed wheels disposed on the outer side of said trucks, each consisting of an eccentric toothed wheel, a toothed wheel of smaller diameter on the outside of said eccentric wheel and a toothed wheel of larger diameter on the inside of said eccentric wheel, the eccentricity of said eccentric wheel being such that the periphery thereof occupies the same position with respect to the wheel axis of the smaller wheel and the same distance therefrom as the periphery of the larger wheel, and a rack for the wheels of each of said groups adapted to successively mesh therewith for assuring proper positioning of said trucks when passing said semicircular sections.

18. A moving sidewalk of the type described comprising in combination, a plurality of groups of closed circuits of trucks normally spaced at regular intervals, a station disposed between each pair of adjacent closed circuits for facilitating travel in both directions, means for displacing said trucks at a predetermined speed, means for progressively diminishing the speed of said trucks when approaching a station, means for progressively increasing the speed of said trucks up to normal value when leaving a station, means for decreasing the distance between trucks when passing a station whereby mounting and descending from the sidewalk is facilitated, a connecting apron for said trucks, means for pivotally securing the said apron to the inner side of said trucks, a plurality of links for securing said apron to the outer side of said trucks for permitting divergence of said trucks, and means for locking said links when said trucks are moving in normal position.

In testimony whereof I have signed my name to this specification.

MAURICE L'HÉRITIER.